United States Patent
Kim et al.

(10) Patent No.: US 10,090,961 B2
(45) Date of Patent: Oct. 2, 2018

(54) MULTI-CHANNEL OPTICAL CROSS-PHASE MODULATION COMPENSATOR

(71) Applicant: Fujitsu Limited, Kawasaki-shi, Kanagawa (JP)

(72) Inventors: Inwoong Kim, Allen, TX (US); Olga Vassilieva, Plano, TX (US); Takeshi Hoshida, Kawasaki (JP); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/373,289

(22) Filed: Dec. 8, 2016

(65) Prior Publication Data

US 2018/0167157 A1 Jun. 14, 2018

(51) Int. Cl.
*H04J 14/00* (2006.01)
*H04J 14/02* (2006.01)
*H04B 10/548* (2013.01)
*H04Q 11/00* (2006.01)
*H04B 10/2543* (2013.01)

(52) U.S. Cl.
CPC ...... *H04J 14/0212* (2013.01); *H04B 10/2543* (2013.01); *H04B 10/548* (2013.01); *H04Q 11/0005* (2013.01); *H04Q 2011/0009* (2013.01); *H04Q 2011/0016* (2013.01); *H04Q 2011/0037* (2013.01)

(58) Field of Classification Search
CPC ............ H04B 10/2557; H04B 10/2543; H04B 10/548; H04J 14/0212; H04Q 11/0005
USPC .......................................................... 398/48
See application file for complete search history.

(56) References Cited

U.S. PATENT DOCUMENTS

| 7,411,903 B2 * | 8/2008 | Jang ...................... H04L 1/1671 370/230 |
|---|---|---|
| 7,542,677 B2 * | 6/2009 | Sekiya ............. H04B 10/25253 398/147 |
| 2005/0226629 A1 | 10/2005 | Ooi et al. |
| 2005/0238362 A1 * | 10/2005 | Sekiya ............... H04B 10/0795 398/147 |
| 2015/0288458 A1 * | 10/2015 | Honda .................... H04J 14/02 398/81 |

OTHER PUBLICATIONS

Chris Xu, Optics Letters vol. 27, No. 18, pp. 1619-1621, Sep. 15, 2002.
Benjamin Foo, "Optoelectronic method for distributed compensation of XPM in long haul WDM system", OFC 2015 © OSA 2015, Th2A.24, 3 pages.
Benjamin Foo, "Distributed Nonlinearity Compensation of Dual-Polarization Signals Using Optoelectronics", IEEE Photonics Technology letters, vol. 28, No. 20, Oct. 15, 2016, pp. 2141-2144.
Ex Parte Quayle Action received for U.S. Appl. No. 15/686,947, dated Jan. 25, 2018; 11 pages.

* cited by examiner

*Primary Examiner* — Tesfaldet Bocure
(74) *Attorney, Agent, or Firm* — Baker Botts L.L.P.

(57) ABSTRACT

A method and system for multi-channel optical XPM compensation may include a DCM to improve performance of a feed-forward control loop in an optical path in an optical network. Additionally, various spectral overlap schemes may be used with multi-channel WDM optical signals using XPM compensators in parallel, such as at a ROADM node. Polarization diversity may also be supported for XPM compensation including a DCM.

20 Claims, 8 Drawing Sheets

MULTI-CHANNEL OPTICAL CROSS-PHASE MODULATION COMPENSATOR

BACKGROUND

Field of the Disclosure

The present disclosure relates generally to optical communication networks and, more particularly, to a multi-channel optical cross-phase modulation (XPM) compensator.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

As data rates for optical networks continue to increase, reaching up to 1 terabit/s (1T) and beyond, the demands on optical signal-to-noise ratios (OSNR) also increase, for example, due to the use of advanced modulation formats, such as QAM and PSK with dual polarization. In addition, phase shifts of optical signals transmitted over optical networks may be observed. The phase shift may be self-phase modulation (SPM) in which light interacts with an optical fiber during transmission. Additionally, XPM may occur in which one wavelength of light can alter the phase of another wavelength of light.

SUMMARY

In one aspect, a disclosed reconfigurable optical add-drop multiplexer (ROADM) may include a first wavelength selective switch (WSS) to switch groups of adjacent channels included in a wavelength division multiplexed (WDM) optical signal provided as input to the first WSS. In the ROADM, a group of adjacent channels may represent an optical band transmitted by the WDM optical signal. The ROADM may further include a first cross-phase modulation (XPM) compensator to receive a first group of the groups of adjacent channels from the first WSS. In the ROADM, the first XPM compensator may further include a feed-forward XPM regulation loop to generate an XPM control signal, the feed-forward XPM regulation loop including a dispersion compensation module (DCM) to add dispersion corresponding to a fraction of an effective length of a fiber optic span carrying the WDM optical signal subsequent to the ROADM. The first XPM compensator may still further include a phase modulator to receive the first group and to receive the XPM control signal, and to output an XPM compensated first group, and a second WSS to receive the XPM compensated first group.

In any of the disclosed embodiments, the ROADM may further include a plurality of XPM compensators in addition to the first XPM compensator to respectively receive additional groups of adjacent channels from the first WSS and to output XPM compensated groups to the second WSS.

In any of the disclosed embodiments of the ROADM, the second WSS may receive the XPM compensated groups and may switch channels corresponding to the WDM optical signal for transmission.

In any of the disclosed embodiments of the ROADM, the first XPM compensator may exclusively compensate a first subgroup for XPM, where the first group includes the first subgroup and at least one additional adjacent channel switched to the first XPM compensator by the first WSS. In the ROADM, the second WSS may drop the at least one adjacent channel received by the first XPM compensator.

In any of the disclosed embodiments of the ROADM, the first XPM compensator may further include a second input to the feed-forward XPM regulation loop to receive the WDM optical signal, and an optical bandpass filter applied to the second input to pass selected groups of adjacent channels from the WDM optical signal in the feed-forward XPM regulation loop.

In any of the disclosed embodiments of the ROADM, the first XPM compensator may be enabled to compensate XPM with polarization diversity for an X-polarization component and a Y-polarization component, while the first XPM compensator further includes a first phase modulator for compensating a first phase corresponding to the X-polarization component, and a second phase modulator for compensating a second phase corresponding to the Y-polarization component.

In another aspect, a disclosed optical system may include a first WSS to switch groups of adjacent channels included in a WDM optical signal provided as input to the first WSS. In the optical system, a group of adjacent channels may represent an optical band transmitted by the WDM optical signal. The optical system may further include a first XPM compensator to receive a first group of the groups of adjacent channels from the first WSS. In the optical system, the first XPM compensator may further include a feed-forward XPM regulation loop to generate an XPM control signal, the feed-forward XPM regulation loop including a DCM to add dispersion corresponding to a fraction of an effective length of a fiber optic span carrying the WDM optical signal subsequent to the optical system. The first XPM compensator may still further include a phase modulator to receive the first group and to receive the XPM control signal, and to output an XPM compensated first group, and a second WSS to receive the XPM compensated first group.

In any of the disclosed embodiments, the optical system may further include a plurality of XPM compensators in addition to the first XPM compensator to respectively receive additional groups of adjacent channels from the first WSS and to output XPM compensated groups to the second WSS.

In any of the disclosed embodiments of the optical system, the second WSS may receive the XPM compensated groups and may switch channels corresponding to the WDM optical signal for transmission.

In any of the disclosed embodiments of the optical system, the first XPM compensator may exclusively compensate a first subgroup for XPM, where the first group includes the first subgroup and at least one additional adjacent channel switched to the first XPM compensator by the first WSS. In the optical system, the second WSS may drop the at least one adjacent channel received by the first XPM compensator.

In any of the disclosed embodiments of the optical system, the first XPM compensator may further include a second input to the feed-forward XPM regulation loop to receive the WDM optical signal, and an optical bandpass filter applied to the second input to pass selected groups of adjacent channels from the WDM optical signal in the feed-forward XPM regulation loop.

In any of the disclosed embodiments of the optical system, the first XPM compensator may be enabled to compensate XPM with polarization diversity for an X-polarization component and a Y-polarization component, while the first XPM compensator further includes a first phase modulator for compensating a first phase corresponding to the X-polarization component, and a second phase modulator for compensating a second phase corresponding to the Y-polarization component.

In yet a further aspect, a disclosed method for XPM compensation of optical signals may include switching groups of adjacent channels included in a WDM optical signal provided as input to a first WSS. In the method, a group of adjacent channels may represent an optical band transmitted by the WDM optical signal. The method may include receiving a first group of the groups of adjacent channels from the first WSS at a first XPM compensator. In the method, the first XPM compensator may be enabled for generating an XPM control signal using a feed-forward XPM regulation loop, the feed-forward XPM regulation loop including a DCM to add dispersion corresponding to a fraction of an effective length of a fiber optic span carrying the WDM optical signal subsequent to a second WSS. In the method, the first XPM compensator may further be enabled for sending the first group and the XPM control signal to a phase modulator to output an XPM compensated first group, and receiving the XPM compensated first group at the second WSS.

In any of the disclosed embodiments, the method may further include receiving additional groups of adjacent channels from the first WSS, respectively sending the additional groups to corresponding plurality of XPM compensators in addition to the first XPM compensator, and outputting XPM compensated groups to the second WSS from the XPM compensators. In the method, the second WSS may receive the XPM compensated groups and may select channels corresponding to the WDM optical signal for transmission.

In any of the disclosed embodiments of the method, the first XPM compensator may exclusively compensates a first subgroup for XPM, where the first group includes the first subgroup and at least one additional adjacent channel switched to the first XPM compensator by the first WSS.

In any of the disclosed embodiments of the method, the second WSS may drop the at least one adjacent channel received by the first XPM compensator.

In any of the disclosed embodiments, the method may further include receiving the WDM optical signal at a second input to the feed-forward XPM regulation loop, and passing selected groups of adjacent channels from the WDM optical signal by an optical bandpass filter applied to the second input in the feed-forward XPM regulation loop.

In any of the disclosed embodiments, the method may further include compensating XPM with polarization diversity for an X-polarization component and a Y-polarization component using the first XPM compensator, including compensating a first phase corresponding to the X-polarization component using a first phase modulator, and compensating a second phase corresponding to the Y-polarization component using a second phase modulator.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
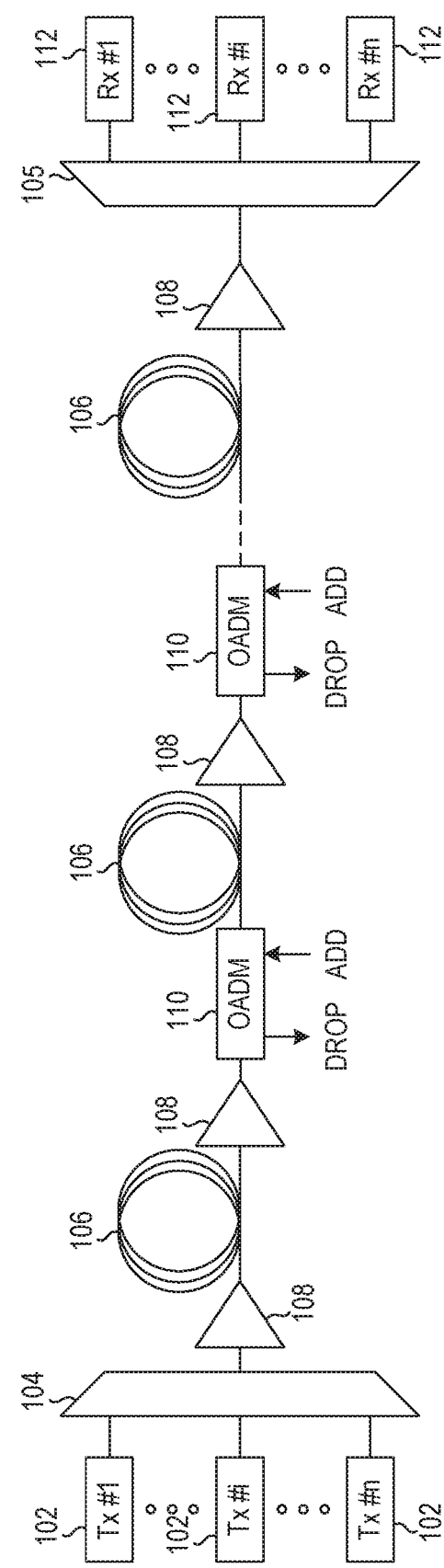
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, XPM may occur in which one wavelength of light can alter the phase of another wavelength of light, such as among the channels of a WDM optical signal. Phase modulation from one WDM channel to another WDM channel may be apparent as a power variation that occurs due to dispersion of the optical signal. Therefore, XPM compensators are known that modulate an entire optical path or optical span between two nodes. While some XPM compensation systems may be effective in improving signal quality when relatively few channels are present (less than about 15 channels), certain XPM compensation systems may actually have a negative effect on optical signal-to-noise ratio (OSNR) as the number of channels increases (greater than about 15 channels).

As will be described in further detail, methods and systems are disclosed herein for implementing a multi-channel optical XPM compensator. The multi-channel optical XPM compensator disclosed herein may enable XPM to be compensated for all channels in a multi-channel WDM optical signal, even for large numbers of channels greater than 15 channels. The multi-channel optical XPM compensator disclosed herein may provide a feed-forward XPM compensation loop with a dispersion compensation module (DCM) to simulate dispersion along an effective length of a subsequent fiber optic span. The multi-channel optical XPM compensator disclosed herein may further be used in configurations that enable simultaneous XPM compensation for all WDM channels, without having to introduce a delay in the propagation of individual WDM channels. The multi-channel optical XPM compensator disclosed herein may be implemented using various spectral overlap schemes to optimize XPM compensation.

In operation of optical network 101, for example, ROADM nodes included in optical network 101 may be equipped with the multi-channel optical XPM compensator disclosed herein.

Figure 2A:
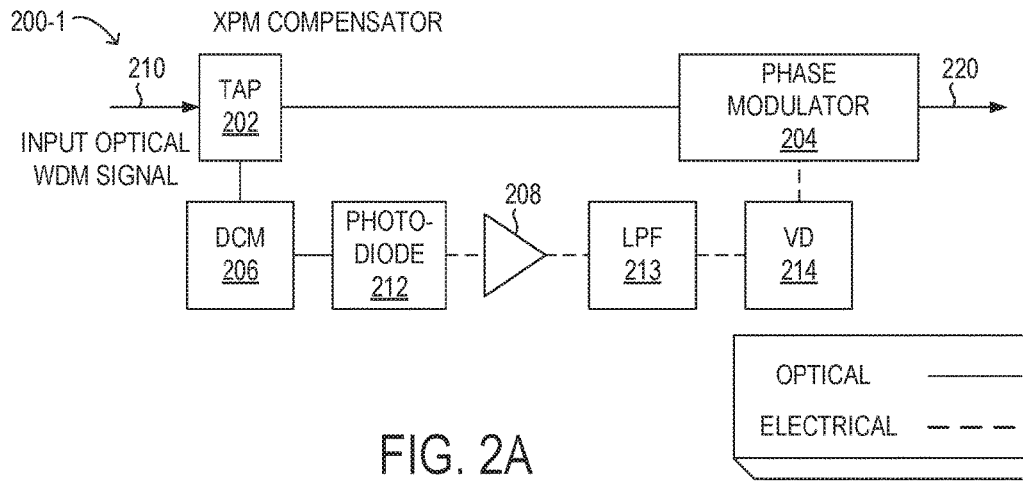
FIGS. 2A, 2B, and 2C are block diagrams of selected elements of example embodiments of an XPM compensator.

Referring now to FIG. 2A, a block diagram of selected elements of an example embodiment of an XPM compensator 200-1 is depicted. In FIG. 2A, XPM compensator 200-1 is shown in a schematic representation and is not drawn to scale. It is noted that, in different embodiments, XPM compensator 200-1 may be operated with additional or fewer elements.

In FIG. 2A, XPM compensator 200-1 includes a feed-forward control loop that extends from optical tap 202 to phase modulator 204, which are placed along a WDM optical path having input WDM optical signal 210 and output WDM optical signal 220. It is noted that different arrangements of components in the feed-forward loop in both the optical and the electrical domain may be implemented in different embodiments. At optical tap 202 (also referred to as an optical splitter), a portion of input WDM optical signal 210 is diverted to the feed-forward control loop. Specifically, DCM 206 receives the optical signal from optical tap 202 and is enabled to add a certain amount of dispersion into the feed-forward control loop in order to enable XPM compensation of the optical signal in an effective length of the optical fiber subsequent to XPM compensator 200-1. Because chromatic dispersion (CD) results in pulse spreading and inter-symbol interference (ISI), the addition of dispersion at DCM 206 may result in improved XPM compensation in the feed-forward loop by simulating XPM that is caused by a power variation of the optical signal along the effective length. Specifically, the dispersion may correspond to a calculated fraction of the effective length, where the fraction is between 0 and 1. After DCM 206, photodiode 212 (or another type of photosensor) receives the optical signal in the feed-forward loop and generates a corresponding electrical signal. As shown in XPM compensator 200-1, an RF amplifier 208 may then amplify the electrical signal received from photodiode 212. Then, a low pass filter (LPF) 213 may be applied to the electrical signal output by RF amplifier 208. After LPF 213, a variable delay 214 applies a time delay to compensate for path length variations before outputting the electrical signal to phase modulator 204. In the exemplary configuration of FIG. 2A, the optical path between tap 202 and phase modulator 204 is assumed to be long enough such that variable delay 214 is capable of tuning or matching the delay between the optical signal arriving at phase modulator 214 and the feed-forward signal at variable delay 214. Phase modulator 204 may operate to modulate the phase of WDM input optical signal 210, based on a received portion of WDM input optical signal 210 from optical tap 202, to generate output WDM optical signal 220, which is XPM compensated.

Figure 2B:
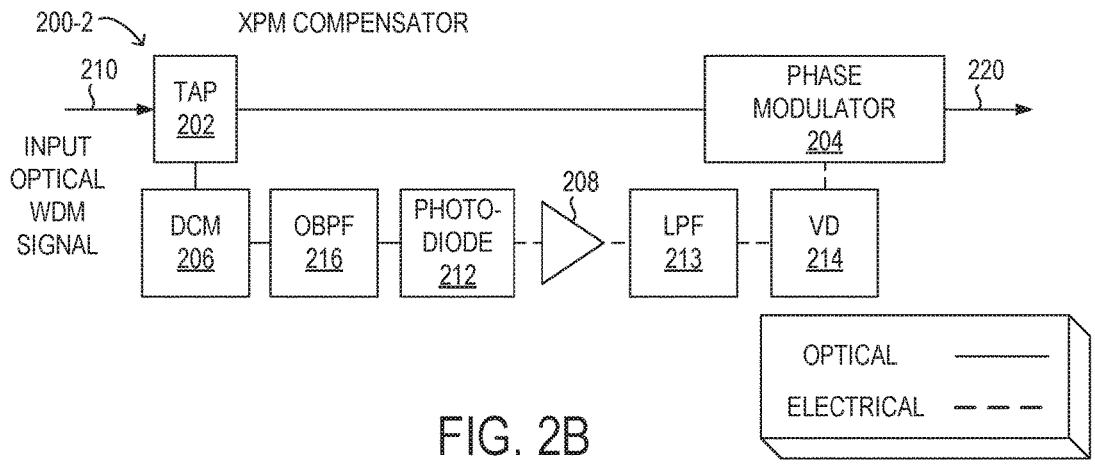

Referring now to FIG. 2B, a block diagram of selected elements of an example embodiment of an XPM compensator 200-2 is depicted. In FIG. 2B, XPM compensator 200-2 is shown in a schematic representation and is not drawn to scale. It is noted that, in different embodiments, XPM compensator 200-2 may be operated with additional or fewer elements.

In FIG. 2B, XPM compensator 200-2 includes all the same elements depicted with regard to XPM compensator 200-1 in FIG. 2A. Additionally, XPM compensator 200-2 includes an optical bandpass filter (OBPF) 216, which may be used to select an optical band from input WDM optical signal 210, such as an optical band including a discrete number of optical channels. When OBPF 216 is used to isolate center wavelength (non-edge wavelength) channels, some improvement in XPM for center wavelength channels may be observed. However, because OBPF 216 uses a more narrowband for the feed-forward loop than input WDM optical signal 210, XPM compensation for edge wavelength channels may suffer, because signal intensity from neighboring channels outside the bandpass of OBPF 216 is not detected for feed-forward compensation and does not contribute to XPM compensation in XPM compensator 200-2.

Figure 2C:
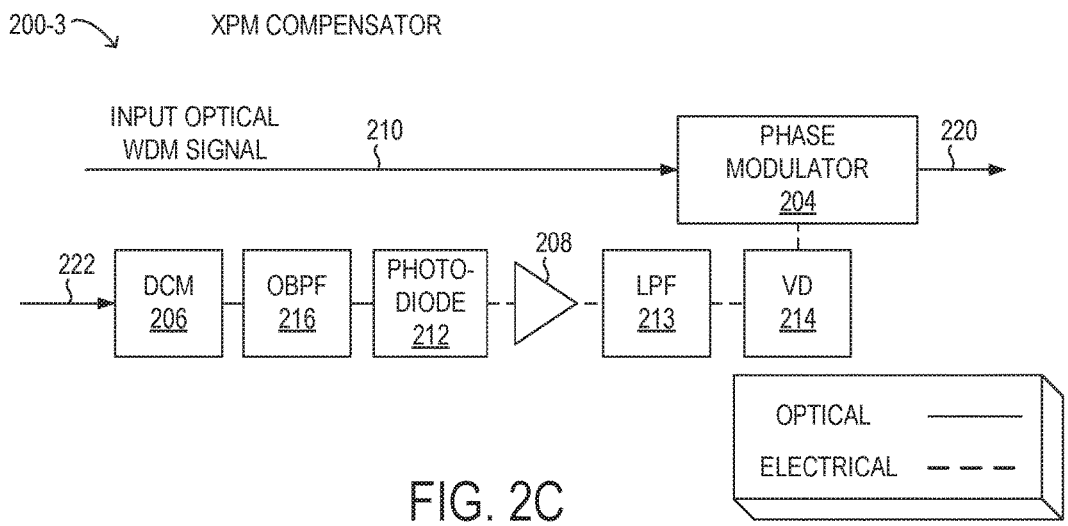

Referring now to FIG. 2C, a block diagram of selected elements of an example embodiment of an XPM compensator 200-3 is depicted. In FIG. 2C, XPM compensator 200-3 is shown in a schematic representation and is not drawn to scale. It is noted that, in different embodiments, XPM compensator 200-3 may be operated with additional or fewer elements.

In FIG. 2C, XPM compensator 200-3 includes a feed-forward control loop that receives an external input 222 and does not rely on an optical tap 202 from input WDM optical signal 210. In this manner, XPM compensator 200-3 may be integrated into various ROADM environments that use a WSS (see also FIG. 6). After receiving external input 222, the feed-forward loop in XPM compensator 200-3 may include the same elements as described above with respect to XPM compensator 200-2 in FIG. 2B.

Figure 3:
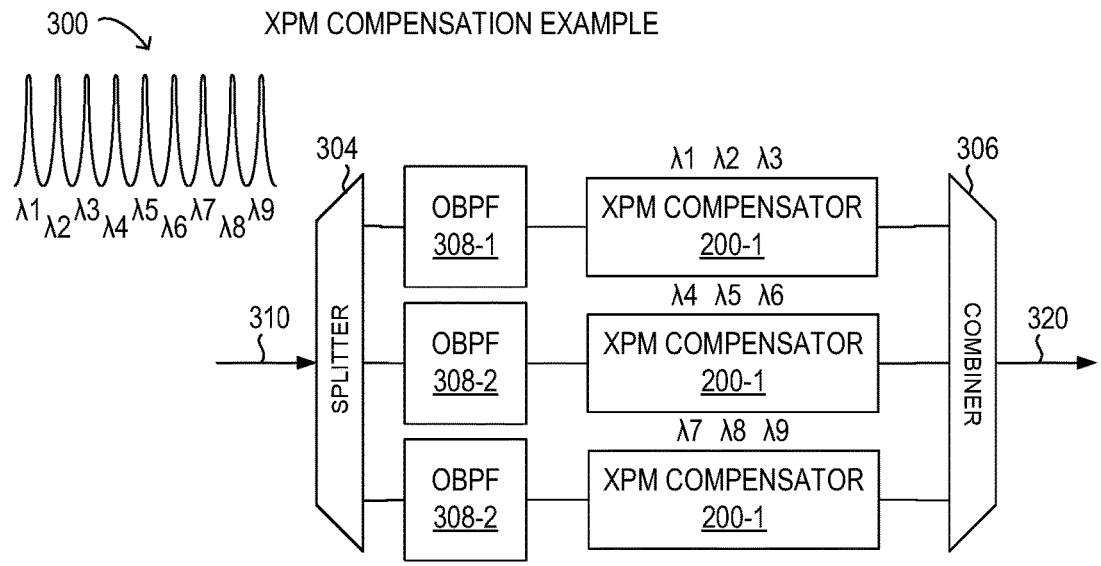
FIG. 3 is a block diagram of selected elements of an embodiment of an XPM compensation example.

Referring now to FIG. 3, selected elements of an embodiment of an XPM compensation example 300 are depicted. FIG. 3, XPM compensation example 300 is shown in a schematic representation and is not drawn to scale. It is noted that, in different embodiments, XPM compensation example 300 may include additional or fewer elements.

In XPM compensation example 300 shown in FIG. 3, it is assumed that an input WDM optical signal 310 consists of nine wavelength channels, shown successively as $\lambda 1$ through $\lambda 9$. It is noted that in various embodiments, different numbers of channels may be included in input WDM optical signal 310 and different numbers of XPM compensators 200 may be used in a variety of different spectral allocation schemes, as desired. XPM compensation example 300 illustrates a spectral allocation scheme in which three instances of XPM compensator 200-1 are used in parallel to compensate XPM on subbands of input WDM optical signal 310. At splitter 304, input WDM optical signal 310 may be split into three separate fibers to OBPF 308-1, 308-2, 308-3 in parallel. Each OBPF 308 may be programmed to pass a certain subband of input WDM optical signal 310. In the example embodiment shown in FIG. 3, each OBPF 308 passes a subband including 3 wavelength channels. Accordingly, OBPF 308-1 passes wavelengths $\lambda 1$, $\lambda 2$, $\lambda 3$; OBPF 308-2 passes wavelengths $\lambda 4$, $\lambda 5$, $\lambda 6$; and OBPF 308-3 passes wavelengths $\lambda 7$, $\lambda 8$, $\lambda 9$. At combiner 306, the XPM compensated subbands are combined to form output WDM optical signal 320.

Figure 4:
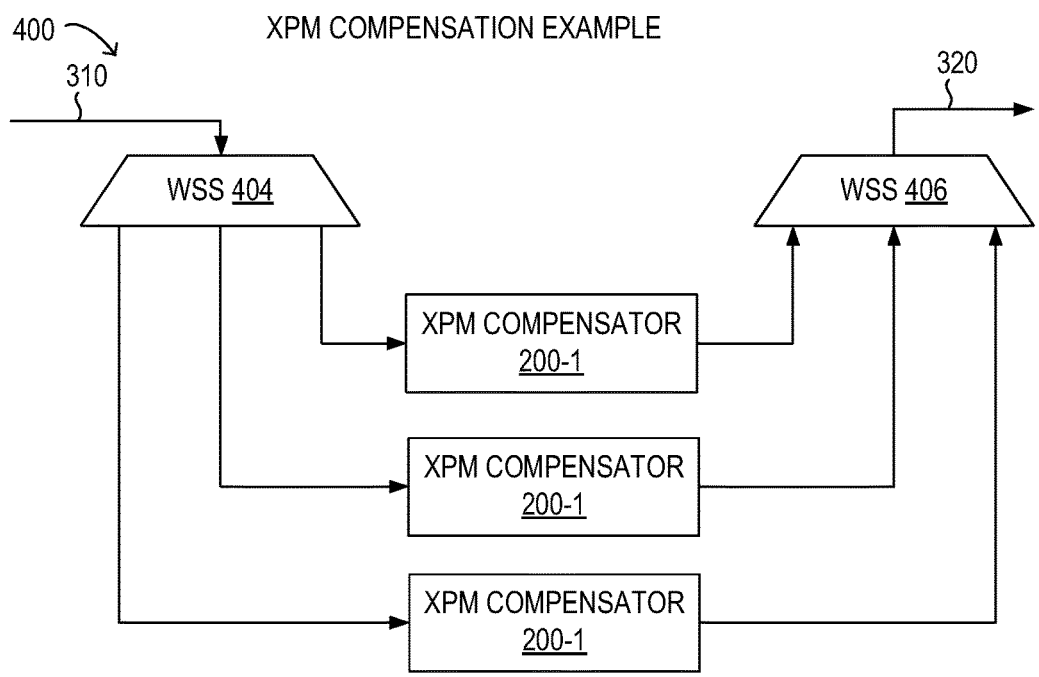
FIG. 4 is a block diagram of selected elements of an embodiment of an XPM compensation example.

Referring now to FIG. 4, selected elements of an embodiment of an XPM compensation example 400 are depicted. FIG. 4, XPM compensation example 400 is shown in a schematic representation and is not drawn to scale. It is noted that, in different embodiments, XPM compensation example 400 may include additional or fewer elements.

In XPM compensation example 400 shown in FIG. 4, an arrangement using WSS 404, 406 instead of splitter 304 and combiner 306 from FIG. 3 is shown. In comparison to splitter 304 and combiner 406, the use of two WSS provides the ability to select individual channels to add and drop from a subband. In one exemplary embodiment, the same spectral allocation scheme described above with respect to FIG. 3 may be implemented using XPM compensation example 400, in which WSS 404 passes each subband in parallel from input WDM optical signal 310 to a respective XPM compensator 200-1, while WSS 406 is used to recombine the subbands into output WDM optical signal 320, which is XPM compensated. It is noted that in various embodiments, different numbers of channels may be included in input WDM optical signal 310 and different numbers of XPM compensators 200 may be used in a variety of different spectral allocation schemes, as desired.

It is further noted that XPM compensation example 400 in FIG. 4 may be used to implement various different spectral allocation schemes, such as described below with respect to FIG. 5.

Figure 5:
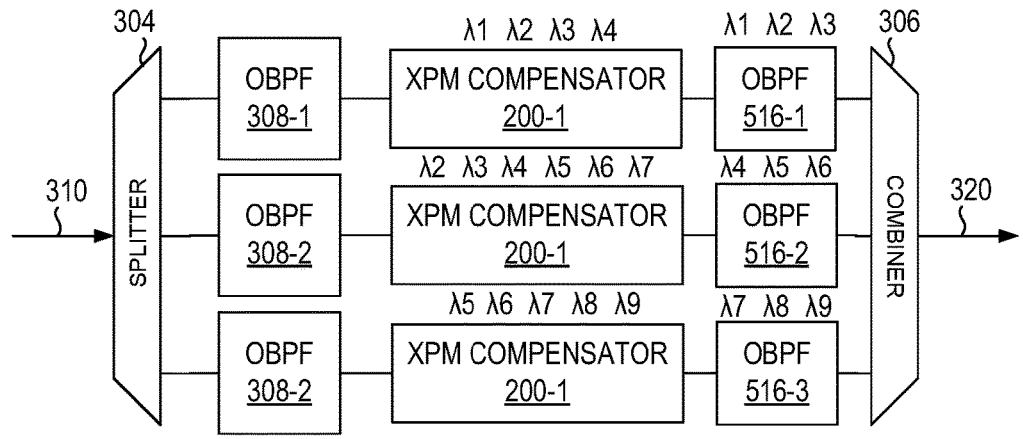
FIG. 5 is a block diagram of selected elements of an embodiment of an XPM compensation example.

Referring now to FIG. 5, selected elements of an embodiment of an XPM compensation example 500 are depicted. FIG. 5, XPM compensation example 500 is shown in a schematic representation and is not drawn to scale. It is noted that, in different embodiments, XPM compensation example 500 may include additional or fewer elements.

In XPM compensation example 500 shown in FIG. 5, it is assumed that an input WDM optical signal 310 consists of nine wavelength channels, as shown in FIG. 3. It is noted that in various embodiments, different numbers of channels may be included in input WDM optical signal 310 and different numbers of XPM compensators 200 may be used in a variety of different spectral allocation schemes, as desired. XPM compensation example 500 illustrates a spectral allocation scheme in which three instances of XPM compensator 200-1 are used in parallel to compensate XPM on subbands of input WDM optical signal 310. At splitter 304, input WDM optical signal 310 may be split into three separate fibers to OBPF 308-1, 308-2, 308-3 in parallel. Each OBPF 308 may be programmed to pass a certain subband of input WDM optical signal 310. In the example embodiment shown in FIG. 5, each OBPF 308 passes a subband including a different number of wavelength channels. As shown, OBPF 308-1 passes wavelengths $\lambda 1$, $\lambda 2$, $\lambda 3$, $\lambda 4$; OBPF 308-2 passes wavelengths $\lambda 2$, $\lambda 3$, $\lambda 4$, $\lambda 5$, $\lambda 6$, $\lambda 7$; and OBPF 308-3 passes wavelengths $\lambda 5$, $\lambda 6$, $\lambda 7$, $\lambda 8$, $\lambda 9$. Then, in XPM compensation example 500, a second OBPF 516 is used to remove the overlapped wavelength channels. Accordingly, OBPF 516-1 passes wavelengths $\lambda 1$, $\lambda 2$, $\lambda 3$; OBPF 516-2 passes wavelengths $\lambda 4$, $\lambda 5$, $\lambda 6$; and OBPF 516-3 passes wavelengths $\lambda 7$, $\lambda 8$, $\lambda 9$. The use of overlapped spectra in XPM compensation example 500 may improve XPM compensation in the respective feed-forward loops of XPM compensator 200-1, while channels with poorer XPM compensation may be dropped. It is noted that gain equalization (not shown) may be applied in XPM compensation example 500 after OBPF 516, depending on the actual spectrum overlap scheme used. Then, the XPM compensated subbands are combined at combiner 306 to form output WDM optical signal 320.

It is noted that the spectral allocation described above may be implemented using XPM compensation example 400 shown in FIG. 4. For example, first WSS 404 may switch the spectral subbands of wavelength channels to respective XPM compensator 200-1, while second WSS 406 may drop the overlapped wavelength channels.

Figure 6:
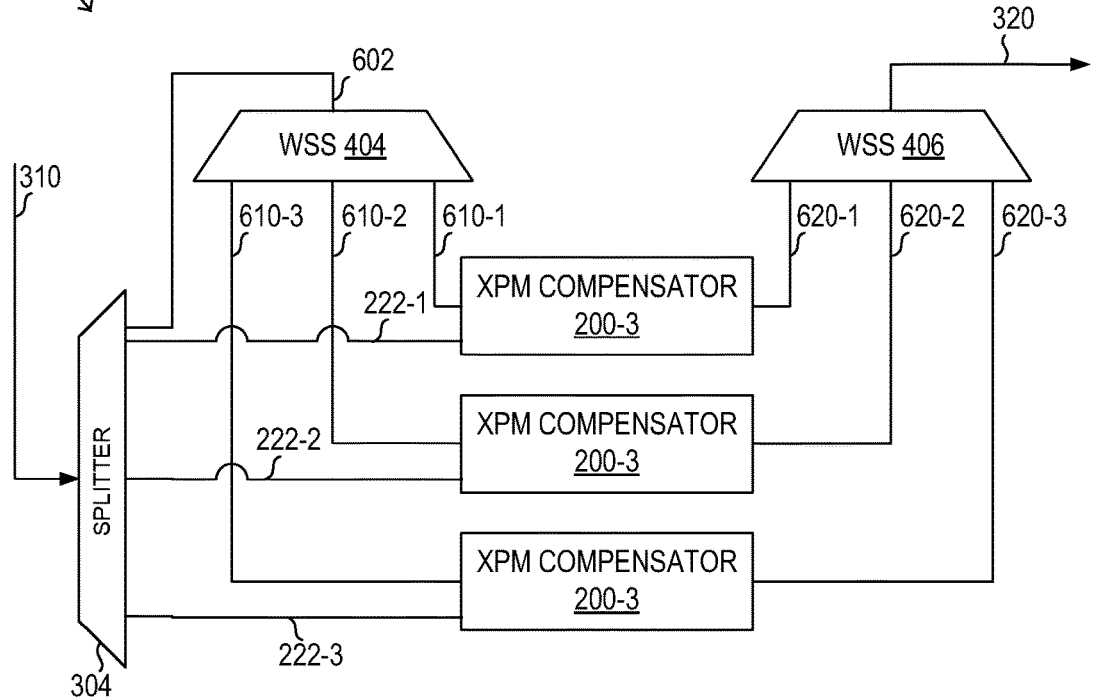
FIG. 6 is a block diagram of selected elements of an embodiment of an XPM compensation example.

Referring now to FIG. 6, selected elements of an embodiment of an XPM compensation example 600 are depicted. FIG. 6, XPM compensation example 600 is shown in a schematic representation and is not drawn to scale. It is noted that, in different embodiments, XPM compensation example 600 may include additional or fewer elements.

In XPM compensation example 600 shown in FIG. 6, it is assumed that an input WDM optical signal 310 consists of nine wavelength channels, as shown in FIG. 3. It is noted that in various embodiments, different numbers of channels may be included in input WDM optical signal 310 and different numbers of XPM compensators 200 may be used in a variety of different spectral allocation schemes, as desired. XPM compensation example 600 illustrates a spectral allocation scheme in which three instances of XPM compensator 200-3 are used in parallel to compensate XPM on subbands of input WDM optical signal 310. At splitter 304, input WDM optical signal 310 may be split into four separate fibers in parallel: one fiber may be used as an input degree 602 for WSS 404, while the other three fibers may be used as external inputs 222 for each respective XPM compensator 200-3. Each OBPF 216 in XPM compensator 200-3 (see FIG. 2C) may be programmed to pass a certain subband of external input 222, which carries input WDM optical signal 310. In the example embodiment shown in FIG. 6, output degree 610-1 from WSS 404 may pass wavelengths $\lambda 1$, $\lambda 2$, $\lambda 3$; output degree 610-2 from WSS 404 may pass wavelengths $\lambda 4$, $\lambda 5$, $\lambda 6$; and output degree 610-3 from WSS 404 may pass wavelengths $\lambda 7$, $\lambda 8$, $\lambda 9$. Concurrently, each external input signal 222 may be subject to OBPF 216 in respective XPM compensator 200-3, such that external input signal 222-1 is spectrally narrowed to a passed subband having wavelengths $\lambda 1$, $\lambda 2$, $\lambda 3$, $\lambda 4$; external input signal 222-2 is spectrally narrowed to a passed subband having wavelengths $\lambda 2$, $\lambda 3$, $\lambda 4$, $\lambda 5$, $\lambda 6$, $\lambda 7$; and external input signal 222-2 is spectrally narrowed to a passed subband having wavelengths $\lambda 5$, $\lambda 6$, $\lambda 7$, $\lambda 8$, $\lambda 9$. It is noted that in some embodiments, external input signal 222-2 may be narrowed using an OBPF that is external to XPM compensator 200-3. Then, XPM compensated subband 620-1 includes wavelengths $\lambda 1$, $\lambda 2$, $\lambda 3$; XPM compensated subband 620-2 includes wavelengths $\lambda 4$, $\lambda 5$, $\lambda 6$; and XPM compensated subband 620-3 includes wavelengths $\lambda 7$, $\lambda 8$, $\lambda 9$. The use of overlapped spectra in XPM compensation example 600 may improve XPM compensation in the respective feed-forward loops of XPM compensator 200-3, while channels with poorer XPM compensation may be dropped. It is noted that gain equalization (not shown) may be applied in XPM compensation example 600, depending on the actual spectrum overlap scheme used. Then, the XPM compensated subbands 620 are combined at WSS 406 to form output WDM optical signal 320.

Figure 7A:
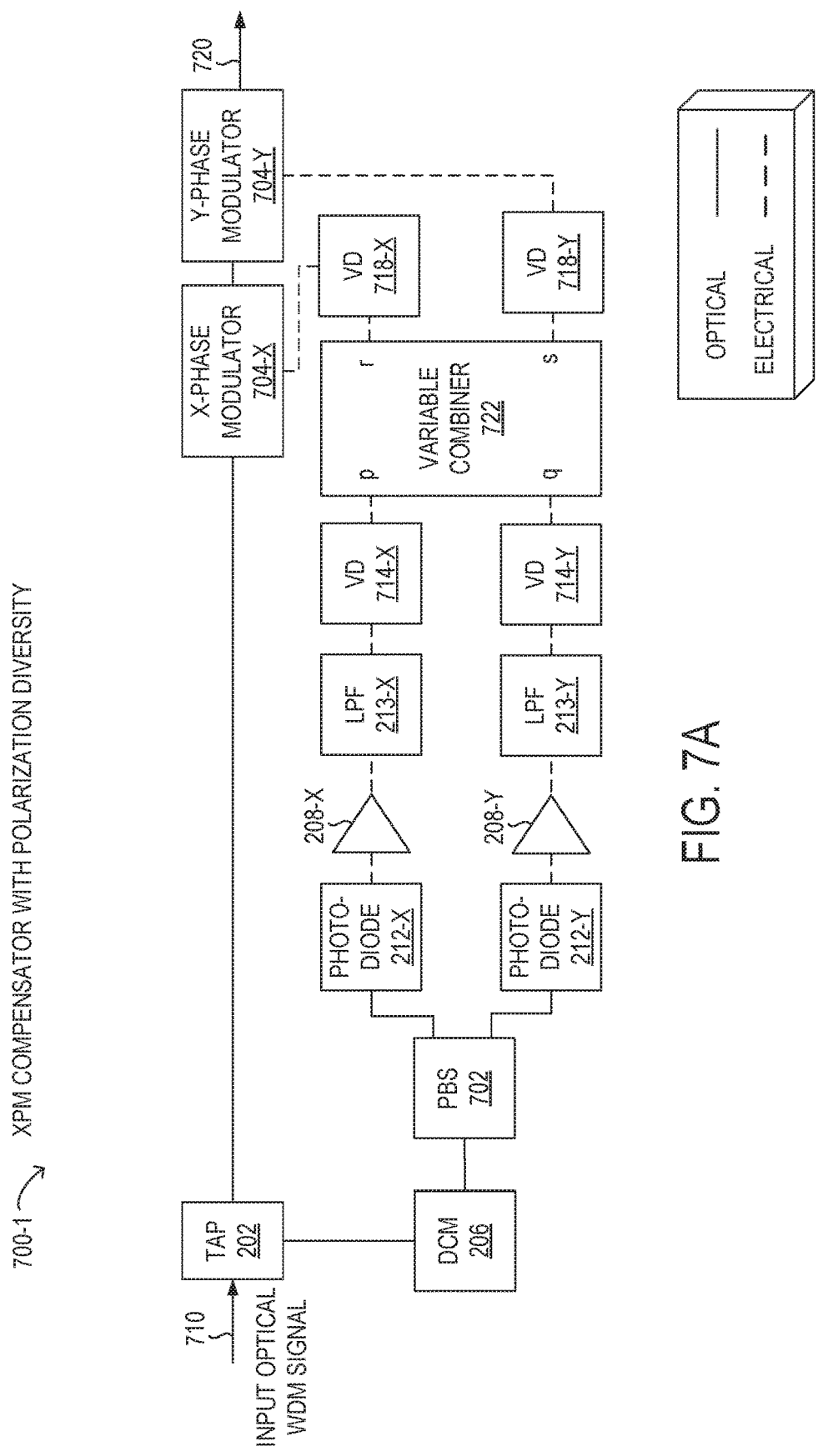
FIGS. 7A, 7B, 7C, and 7D are block diagrams of selected elements of example embodiments of an XPM compensator with polarization diversity.

Referring now to FIG. 7A, a block diagram of selected elements of an example embodiment of an XPM compensator 700-1 with polarization diversity is depicted. In FIG. 7A, XPM compensator 700-1 is shown in a schematic representation and is not drawn to scale. It is noted that, in different embodiments, XPM compensator 700-1 may be operated with additional or fewer elements.

In FIG. 7A, it is assumed that input WDM optical signal 710 has polarization diversity, such that an X-polarized component and a Y-polarized component of the optical signal are present. XPM compensator 700-1 includes a feed-forward control loop that extends from optical tap 202 to phase modulators 704, which are placed along a WDM optical path having input WDM optical signal 710 and output WDM optical signal 720. At optical tap 202 (also referred to as an optical splitter), a portion of input WDM optical signal 710 is diverted to the feed-forward control loop. Specifically, DCM 206 receives the optical signal from optical tap 202 and is enabled to add a certain amount of dispersion into the feed-forward control loop, as described above with respect to FIG. 2A. After DCM 206, a polarization beam splitter (PBS) 702 further splits the optical signal into the X-polarized component and the Y-polarized component. The X-polarized component is fed from PBS 702 to photodiode 212-X, which generates an electrical signal that is amplified by RF amplifier 208-X and filtered using LPF 213-X. The Y-polarized component is fed from PBS 702 to photodiode 212-Y, which generates an electrical signal that is amplified by RF amplifier 208-Y and filtered using LPF 213-Y. Then, an variable combiner 722 may be applied to the electrical signals from LPF 213-X, 213-Y, using inputs p, q and output r, s, such that: $r=h_{11}p+h_{12}q$, $s=h_{21}p+h_{22}q$, where h is a weighting factor. In one example, $h_{11}=h_{12}=h_{21}=h_{22}=0.5$, although different values may be used in different embodiments. Furthermore, variable delays 714-X and 718-X are used before and after variable combiner 722 for the X-polarized component signal, while variable delays 714-Y and 718-Y are used before and after variable combiner 722 for the Y-polarized component signal. Then, variable delay 718-X outputs a control signal for the X-polarized component to X-phase modulator 704-X, while variable delay 718-Y outputs a control signal for the Y-polarized component to Y-phase modulator 704-Y, to generate output WDM optical signal 720, which is XPM compensated with polarization diversity.

Figure 7B:
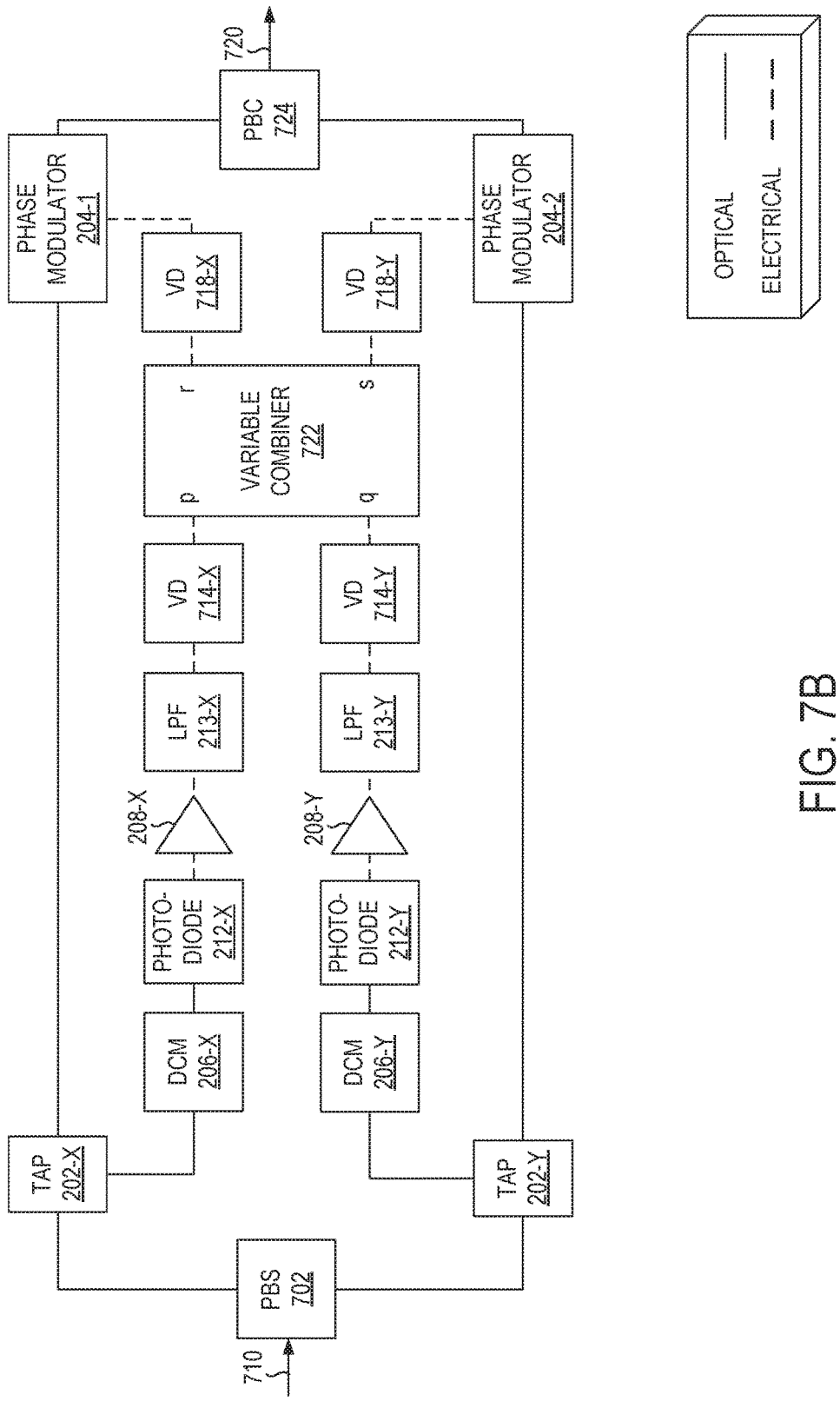

Referring now to FIG. 7B, a block diagram of selected elements of an example embodiment of an XPM compensator 700-2 with polarization diversity is depicted. In FIG. 7B, XPM compensator 700-2 is shown in a schematic representation and is not drawn to scale. It is noted that, in different embodiments, XPM compensator 700-2 may be operated with additional or fewer elements.

In FIG. 7B, it is assumed that input WDM optical signal 710 has polarization diversity, such that an X-polarized component and a Y-polarized component of the optical signal are present. XPM compensator 700-2 includes a feed-forward control loop that extends from optical tap 202 to phase modulators 204, which are placed along a WDM optical path having input WDM optical signal 710 and output WDM optical signal 720. Input WDM optical signal 710 is received at PBS 702, which separates the X-polarized component and the Y-polarized component along different optical fibers. At optical tap 202-X, a portion of the X-polarized component is diverted to an X-polarization feed-forward control loop, while at optical tap 202-Y, a portion of the Y-polarized component is diverted to a Y-polarization feed-forward control loop. Specifically, in the X-polarization feed forward control loop, DCM 206-X receives the optical signal from optical tap 202-X and is enabled to add a certain amount of dispersion into the X feed-forward control loop, as described above with respect to FIG. 2A, while in the Y-polarization feed forward control loop, DCM 206-Y receives the optical signal from optical tap 202-Y and is enabled to add a certain amount of dispersion into the Y feed-forward control loop. After DCM 206-X, the X-polarized component is fed to photodiode 212-X, which generates an electrical signal that is amplified by RF amplifier 208-X and filtered using LPF 213-X. After DCM 206-Y, the Y-polarized component is fed to photodiode 212-Y, which generates an electrical signal that is amplified by RF amplifier 208-Y and filtered using LPF 213-Y. Then, variable combiner 722 may be applied to the electrical signals from LPF 213-X, 213-Y, as described above with respect to FIG. 7A, including variable delays 714-X and 718-X that are used before and after variable combiner 722 for the X-polarized component signal, and variable delays 714-Y and 718-Y that are used before and after variable combiner 722 for the Y-polarized component signal. Then, variable delay 718-X outputs a control signal for the X-polarized component to a first phase modulator 204-1, while variable delay 718-Y outputs a control signal for the Y-polarized component to a second phase modulator 204-2. The output signals from phase modulators 204 are combined at polarization beam combiner 724 to generate output WDM optical signal 720, which is XPM compensated with polarization diversity.

Figure 7C:
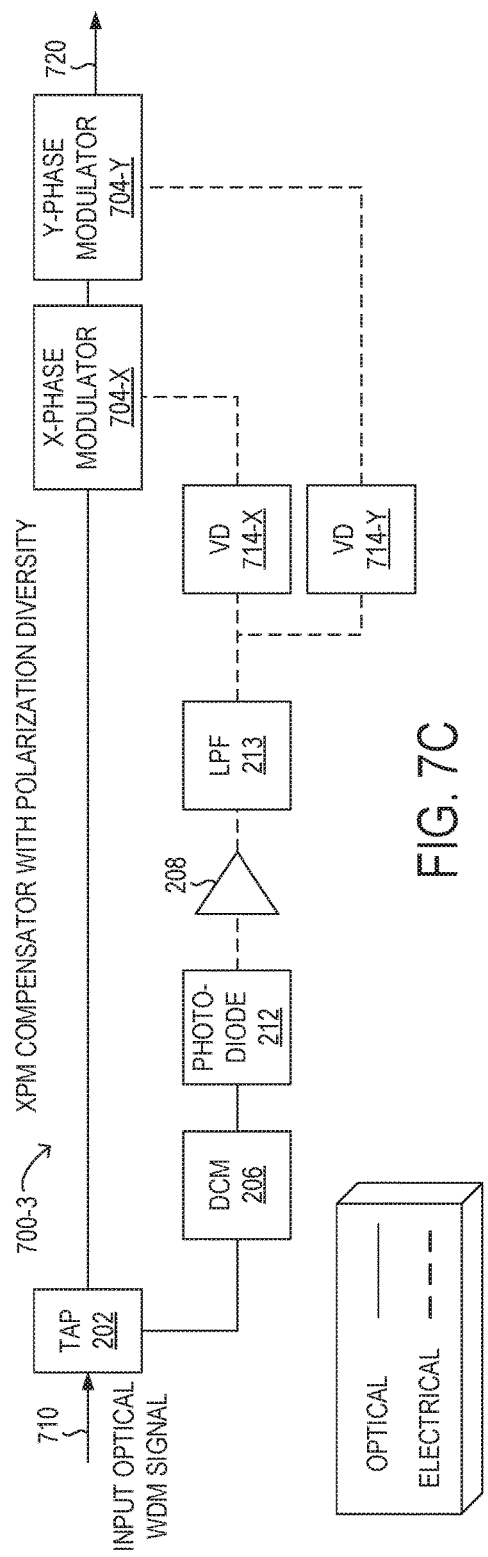

Referring now to FIG. 7C, a block diagram of selected elements of an example embodiment of an XPM compensator 700-3 with polarization diversity is depicted. In FIG. 7C, XPM compensator 700-3 is shown in a schematic representation and is not drawn to scale. It is noted that, in different embodiments, XPM compensator 700-3 may be operated with additional or fewer elements.

In FIG. 7C, it is assumed that input WDM optical signal 710 has polarization diversity, such that an X-polarized component and a Y-polarized component of the optical signal are present. XPM compensator 700-3 includes a feed-forward control loop that extends from optical tap 202 to phase modulators 704, which are placed along a WDM optical path having input WDM optical signal 710 and output WDM optical signal 720. At optical tap 202, a portion of input WDM optical signal 710 is diverted to the feed-forward control loop. Specifically, DCM 206 receives the optical signal from optical tap 202 and is enabled to add a certain amount of dispersion into the feed-forward control loop, as described above with respect to FIG. 2A. Photodiode 212, RF amplifier 208, and LPF 213 operate in a substantially similar manner as described with respect to FIG. 2A. After LPF 213, the electrical signal is fed to variable delay 714-X and variable delay 714-Y in order to adjust for the X-polarized component and the Y-polarized component. The arrangement shown in FIG. 7C may be substantially equivalent to the use of an variable combiner with $h_{11}=h_{12}=h_{21}=h_{22}=0.5$, as shown in FIG. 7A. Then, variable delay 714-X outputs a control signal for the X-polarized component to X-phase modulator 704-X, while variable delay 714-Y outputs a control signal for the Y-polarized component to Y-phase modulator 704-Y, to generate output WDM optical signal 720, which is XPM compensated with polarization diversity.

Figure 7D:
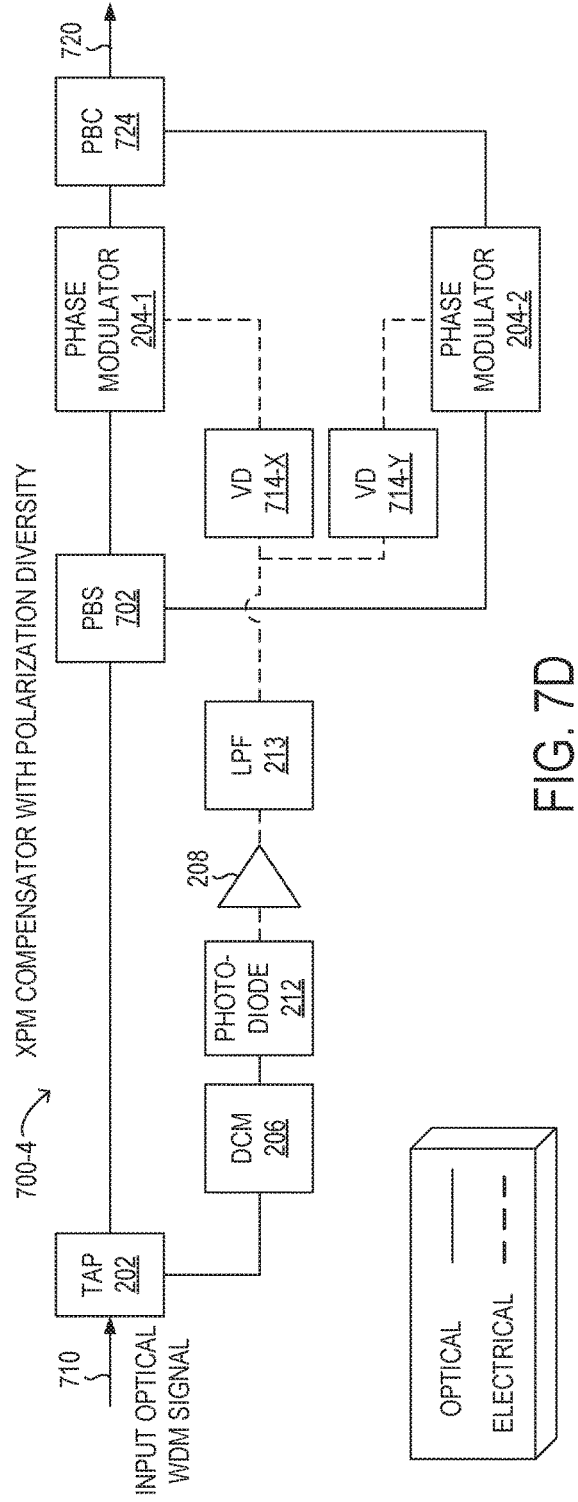

Referring now to FIG. 7D, a block diagram of selected elements of an example embodiment of an XPM compensator 700-4 with polarization diversity is depicted. In FIG. 7D, XPM compensator 700-4 is shown in a schematic representation and is not drawn to scale. It is noted that, in different embodiments, XPM compensator 700-4 may be operated with additional or fewer elements.

In FIG. 7D, it is assumed that input WDM optical signal 710 has polarization diversity, such that an X-polarized component and a Y-polarized component of the optical signal are present. XPM compensator 700-4 includes a feed-forward control loop that extends from optical tap 202 to phase modulators 204, which are placed along a WDM optical path having input WDM optical signal 710 and output WDM optical signal 720. At optical tap 202, a portion of input WDM optical signal 710 is diverted to the feed-forward control loop, while the remaining portion is diverted to PBS 702. Specifically, DCM 206 receives the optical signal from optical tap 202 and is enabled to add a certain amount of dispersion into the feed-forward control loop, as described above with respect to FIG. 2A. Photodiode 212, RF amplifier 208, and LPF 213 operate in a substantially similar manner as described with respect to FIG. 2A. After LPF 213, the electrical signal is fed to variable delay 714-X and variable delay 714-Y in order to adjust for the X-polarized component and the Y-polarized component. The arrangement shown in FIG. 7D may be substantially equivalent to the use of an variable combiner with $h_{11}=h_{12}=h_{21}=h_{22}=0.5$, as shown in FIG. 7A. Then, variable delay 714-X outputs a control signal for the X-polarized component to a first phase modulator 204-1, while variable delay 714-Y outputs a control signal for the Y-polarized component to a second phase modulator 204-2. The first phase modulator 204-1 receives the X-polarized component from PBS 702, while the second phase modulator 204-2 receives the Y-polarized component from PBS 702. The outputs from the first and second phase modulators 204, corresponding to the X-polarized component and the Y-polarized component, are combined at PBC 724 to generate output WDM optical signal 720, which is XPM compensated with polarization diversity.

Figure 8:
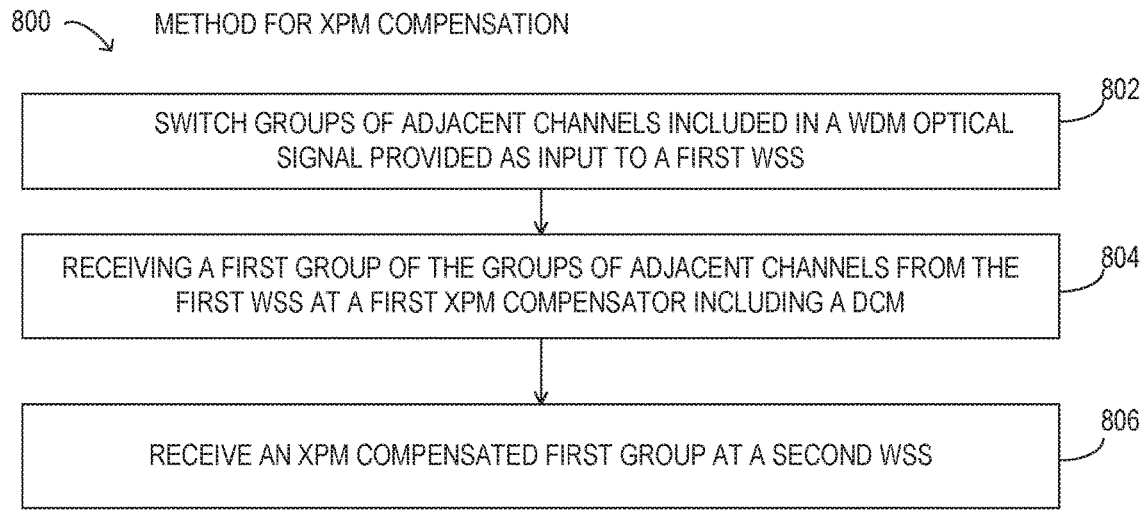
FIG. 8 is a flow chart of selected elements of a method for XPM compensation.

Referring now to FIG. 8, a flowchart of selected elements of an embodiment of a method 800 for XPM compensation, as described herein, is depicted. In various embodiments, method 800 may be performed using XPM compensators 200, 700 in a ROADM node in an optical network, for example, corresponding to XPM compensation examples 400, 600. It is noted that certain operations described in method 800 may be optional or may be rearranged in different embodiments.

Method 800 may begin at step 802 by switching groups of adjacent channels included in a WDM optical signal provided as input to a first WSS. At step 804, a first group of the groups of adjacent channels is received from the first WSS at a first XPM compensator including a DCM. At step 806, an XPM compensated first group is received at a second WSS.

Figure 9:
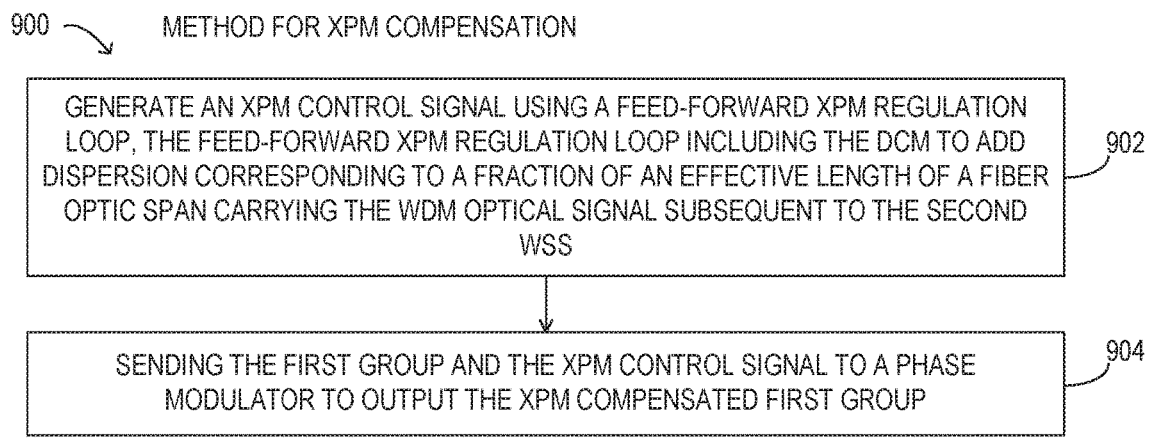
FIG. 9 is a flow chart of selected elements of a method for XPM compensation.

Referring now to FIG. 9, a flowchart of selected elements of an embodiment of method 900 for XPM compensation, as described herein, is depicted. In various embodiments, method 900 may be performed by XPM compensators 200, 700 in a ROADM node in an optical network, for example, in XPM compensation examples 400, 600. It is noted that certain operations described in method 900 may be optional or may be rearranged in different embodiments.

Method 900 may begin at step 902 by generating an XPM control signal using a feed-forward XPM regulation loop, the feed-forward XPM regulation loop including the DCM to add dispersion corresponding to a fraction of an effective length of a fiber optic span carrying the WDM optical signal subsequent to the second WSS. At step 902, the first group and the XPM control signal are sent to a phase modulator to output the XPM compensated first group.

As disclosed herein, method and system for multi-channel optical XPM compensation may include a DCM to improve performance of a feed-forward control loop in an optical path in an optical network. Additionally, various spectral overlap schemes may be used with multi-channel WDM optical signals using XPM compensators in parallel, such as at a ROADM node. Polarization diversity may also be supported for XPM compensation including a DCM.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reconfigurable optical add-drop multiplexer (ROADM), comprising:
   a first wavelength selective switch (WSS) to switch groups of adjacent channels included in a wavelength division multiplexed (WDM) optical signal provided as input to the first WSS, wherein a group of adjacent channels represents an optical band transmitted by the WDM optical signal;

a first cross-phase modulation (XPM) compensator to receive a first group of the groups of adjacent channels from the first WSS, the first XPM compensator further comprising:
a feed-forward XPM regulation loop to generate an XPM control signal, the feed-forward XPM regulation loop including a dispersion compensation module to add dispersion corresponding to a fraction of an effective length of a fiber optic span carrying the WDM optical signal subsequent to the ROADM; and
a phase modulator to receive the first group and to receive the XPM control signal, and to output an XPM compensated first group; and
a second WSS to receive the XPM compensated first group.

2. The ROADM of claim 1, further comprising:
a plurality of XPM compensators in addition to the first XPM compensator to respectively receive additional groups of adjacent channels from the first WSS and to output XPM compensated groups to the second WSS.

3. The ROADM of claim 1, wherein the second WSS receives the XPM compensated groups and switches channels corresponding to the WDM optical signal for transmission.

4. The ROADM of claim 1, wherein the first XPM compensator exclusively compensates a first subgroup for XPM, wherein the first group includes the first subgroup and at least one additional adjacent channel switched to the first XPM compensator by the first WSS.

5. The ROADM of claim 4, wherein the second WSS drops the at least one adjacent channel received by the first XPM compensator.

6. The ROADM of claim 1, wherein the first XPM compensator further comprises:
a second input to the feed-forward XPM regulation loop to receive the WDM optical signal; and
an optical bandpass filter applied to the second input to pass selected groups of adjacent channels from the WDM optical signal in the feed-forward XPM regulation loop.

7. The ROADM of claim 1, wherein the first XPM compensator is enabled to compensate XPM with polarization diversity for an X-polarization component and a Y-polarization component, wherein the first XPM compensator further comprises:
a first phase modulator for compensating a first phase corresponding to the X-polarization component; and
a second phase modulator for compensating a second phase corresponding to the Y-polarization component.

8. An optical system, comprising:
a first wavelength selective switch (WSS) to switch groups of adjacent channels included in a wavelength division multiplexed (WDM) optical signal provided as input to the first WSS, wherein a group of adjacent channels represents an optical band transmitted by the WDM optical signal;
a first cross-phase modulation (XPM) compensator to receive a first group of the groups of adjacent channels from the first WSS, the first XPM compensator further comprising:
a feed-forward XPM regulation loop to generate an XPM control signal, the feed-forward XPM regulation loop including a dispersion compensation module to add dispersion corresponding to a fraction of an effective length of a fiber optic span carrying the WDM optical signal subsequent to the optical system; and
a phase modulator to receive the first group and to receive the XPM control signal, and to output an XPM compensated first group; and
a second WSS to receive the XPM compensated first group.

9. The optical system of claim 8, further comprising:
a plurality of XPM compensators in addition to the first XPM compensator to respectively receive additional groups of adjacent channels from the first WSS and to output XPM compensated groups to the second WSS.

10. The optical system of claim 8, wherein the second WSS receives the XPM compensated groups and selects channels corresponding to the WDM optical signal for transmission.

11. The optical system of claim 8, wherein the first XPM compensator exclusively compensates a first subgroup for XPM, wherein the first group includes the first subgroup and at least one additional adjacent channel switched to the first XPM compensator by the first WSS.

12. The optical system of claim 11, wherein the second WSS drops the at least one adjacent channel received by the first XPM compensator.

13. The optical system of claim 8, wherein the first XPM compensator further comprises:
a second input to the feed-forward XPM regulation loop to receive the WDM optical signal; and
an optical bandpass filter applied to the second input to pass selected groups of adjacent channels from the WDM optical signal in the feed-forward XPM regulation loop.

14. The optical system of claim 8, wherein the first XPM compensator is enabled to compensate XPM with polarization diversity for an X-polarization component and a Y-polarization component, wherein the first XPM compensator further comprises:
a first phase modulator for compensating a first phase corresponding to the X-polarization component; and
a second phase modulator for compensating a second phase corresponding to the Y-polarization component.

15. A method for cross-phase modulation (XPM) compensation of optical signals, the method comprising:
switching groups of adjacent channels included in a wavelength division multiplexed (WDM) optical signal provided as input to a first wavelength selective switch (WSS), wherein a group of adjacent channels represents an optical band transmitted by the WDM optical signal;
receiving a first group of the groups of adjacent channels from the first WSS at a first cross-phase modulation (XPM) compensator, the first XPM compensator further enabled for:
generating an XPM control signal using a feed-forward XPM regulation loop, the feed-forward XPM regulation loop including a dispersion compensation module (DCM) to add dispersion corresponding to a fraction of an effective length of a fiber optic span carrying the WDM optical signal subsequent to a second WSS; and
sending the first group and the XPM control signal to a phase modulator to output an XPM compensated first group; and
receiving the XPM compensated first group at the second WSS.

16. The method of claim 15, further comprising:
receiving additional groups of adjacent channels from the first WSS;

respectively sending the additional groups to corresponding plurality of XPM compensators in addition to the first XPM compensator; and outputting XPM compensated groups to the second WSS from the XPM compensators, wherein the second WSS receives the XPM compensated groups and selects channels corresponding to the WDM optical signal for transmission.

17. The method of claim 15, wherein the first XPM compensator exclusively compensates a first subgroup for XPM, wherein the first group includes the first subgroup and at least one additional adjacent channel switched to the first XPM compensator by the first WSS.

18. The method of claim 15, wherein the second WSS drops the at least one adjacent channel received by the first XPM compensator.

19. The method of claim 15, further comprising:
receiving the WDM optical signal at a second input to the feed-forward XPM regulation loop; and
passing selected groups of adjacent channels from the WDM optical signal by an optical bandpass filter applied to the second input in the feed-forward XPM regulation loop.

20. The method of claim 15, further comprising:
compensating XPM with polarization diversity for an X-polarization component and a Y-polarization component using the first XPM compensator, including:
compensating a first phase corresponding to the X-polarization component using a first phase modulator; and
compensating a second phase corresponding to the Y-polarization component using a second phase modulator.

* * * * *